Jan. 31, 1950
C. H. KELLEY
2,495,974
ROTARY MEASURING DEVICE
Filed Dec. 29, 1948
3 Sheets-Sheet 1
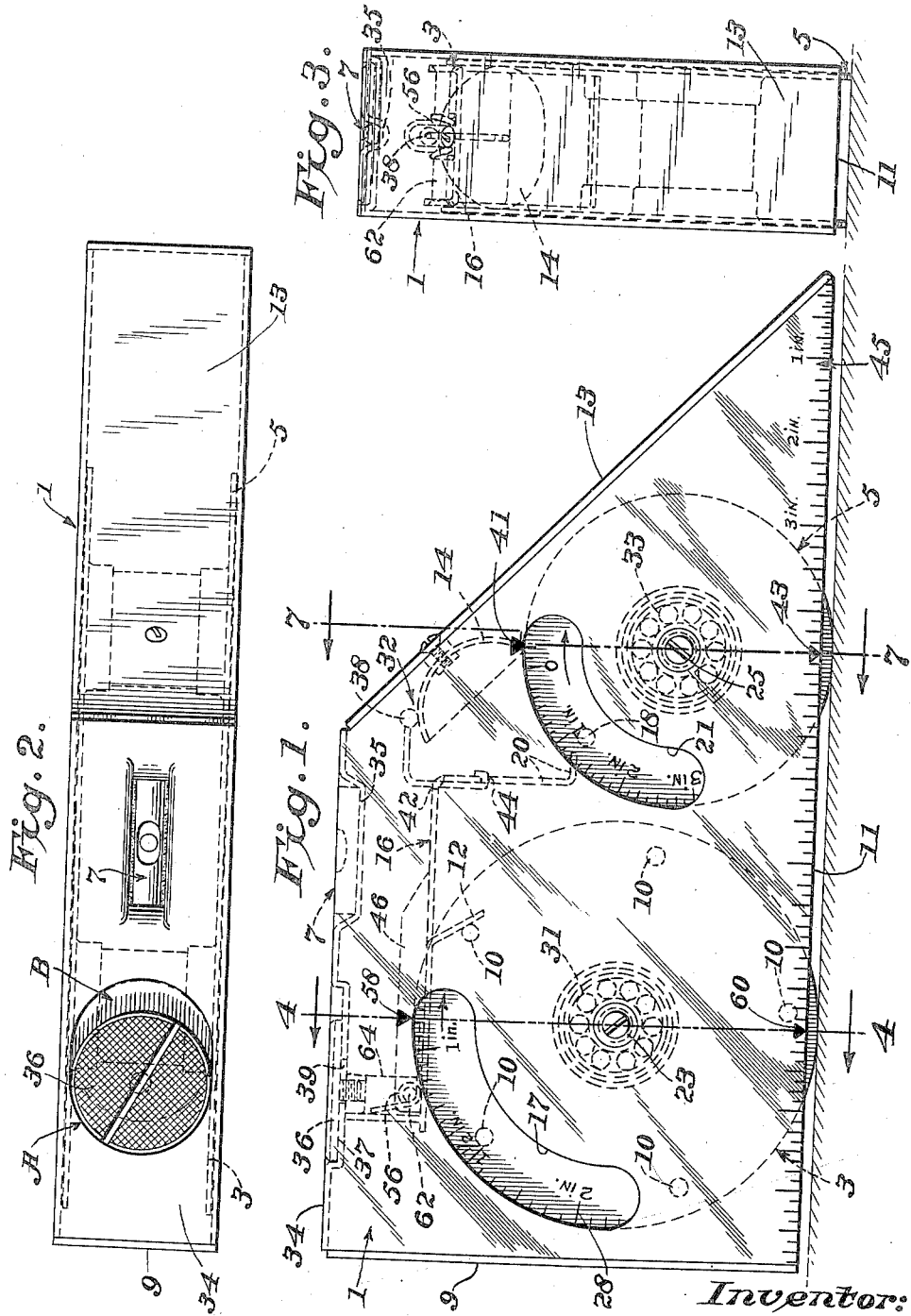
Inventor:
Clifford H. Kelley,
By Cushman, Darby & Cushman
Attorneys.

Jan. 31, 1950          C. H. KELLEY          2,495,974
ROTARY MEASURING DEVICE
Filed Dec. 29, 1948          3 Sheets-Sheet 2
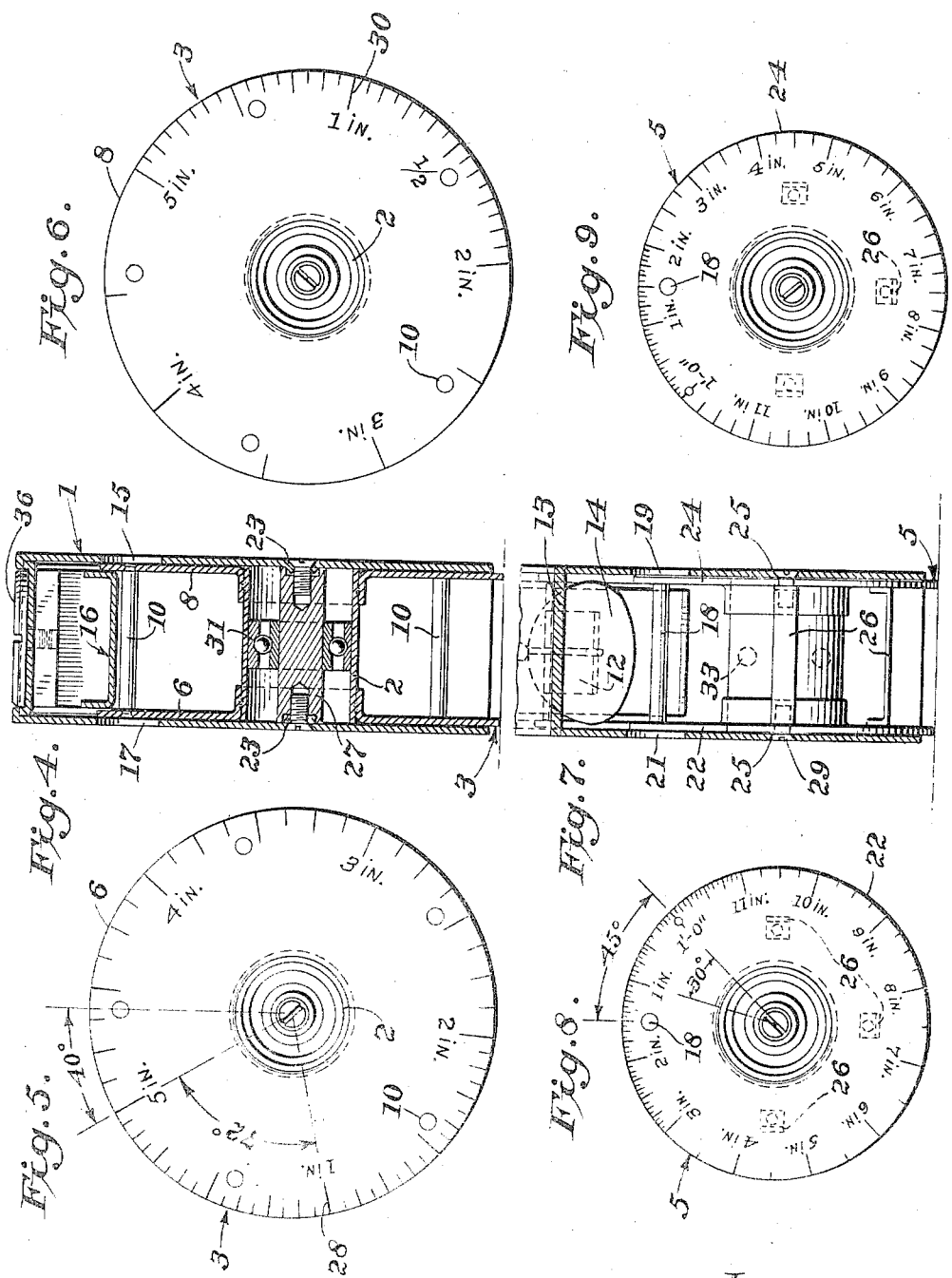
Inventor:
Clifford H. Kelley,
By Cushman, Darby & Cushman
Attorneys.

Jan. 31, 1950 — C. H. KELLEY — 2,495,974
ROTARY MEASURING DEVICE
Filed Dec. 29, 1948 — 3 Sheets-Sheet 3
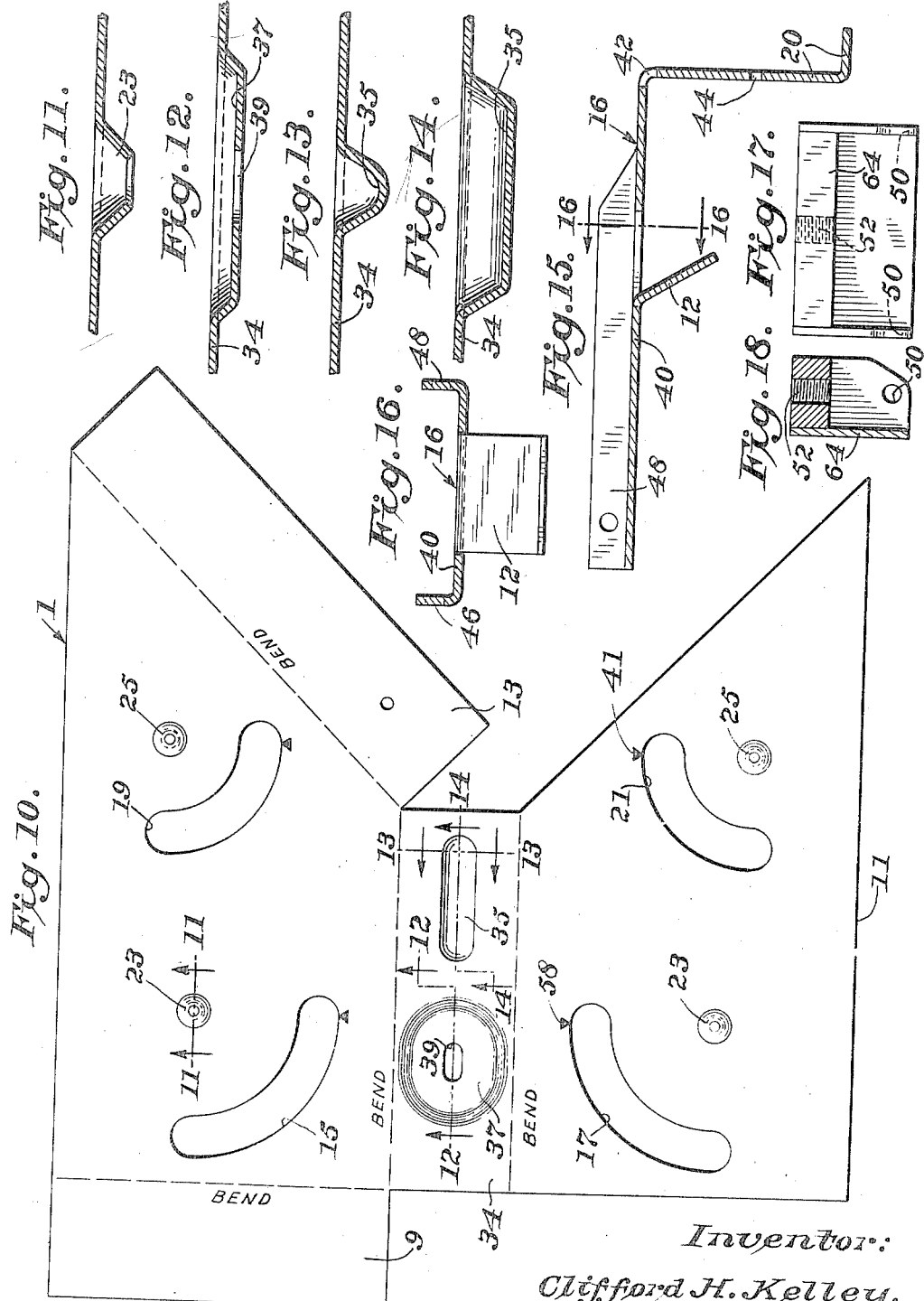
Inventor:
Clifford H. Kelley,
By Cushman, Darby & Cushman
Attorneys.

Patented Jan. 31, 1950

2,495,974

UNITED STATES PATENT OFFICE 2,495,974

ROTARY MEASURING DEVICE

Clifford H. Kelley, Chattanooga, Tenn.

Application December 29, 1948, Serial No. 68,003

3 Claims. (Cl. 33—141.5)

This invention relates to rotary measuring devices and more particularly to such devices that are used for the measurement of circumferences, linear distances, angles and elevations.

It is the primary object of this invention to provide a linear rule, and a circumference rule that incorporates an audible indicating system that may be selectively used with either rule. It is a distinct advantage to have an audible signal indicate certain specified increments of distance so that the user does not constantly have to watch the indicating dial, but may concentrate on obtaining an accurate measurement.

Another object of this invention is to cooperatively combine a linear rule, a circumference rule, a level, an angle, and a square in one compact tool for use by engineers, carpenters, layout men, sheet metal workers, draftsmen, and men of other arts and trades.

A further object of this invention is to provide a linear rule for simple and accurate measurement of linear dimensions of great distance and of a surface regardless of contour.

It is also an object of this invention to provide a measuring device that may be used by one man to perform the maximum number of operations with the one instrument.

Other objects of novel features of construction and combination of parts will be hereinafter described in the specification and then claimed, having the above and other objects in view.

These objects are accomplished by the provision of a rotary rule combining a level, a square, a 45° angle and two rotatable measuring rule wheels which selectively cooperate with an audible indicating system. A liquid level is mounted in the top of the frame of said device for determining the horizontal. On side of the device is made perpendicular to the base for determining a right angle or perpendicular while the other side is made at a 45° angle with base for determining said angle. The device does not have to be limited to the square but may be made to include any desired combination of angles. Two rotatable wheels are provided. One rotatable wheel, which will hereinafter be referred to as the circumference rule, is used for laying off a circumference of a desired diameter pipe or duct on a flat sheet or surface. The circumference rule which accomplishes this measurement, measures the circumference required for a desired diameter. Thus, if a one inch diameter pipe is desired, the rule will measure off 3.1416 inches on flat sheet material. Even though the circumference is accurately measured on the surface, the indicating dial is marked off in equal increments of diameter. The device may also be used to determine the outside diameter of a pipe. This is accomplished by aligning the starting point on the pipe with the reference line on the device, and then rolling the device about the circumference of the pipe. The other rotatable wheel, which will hereinafter be referred to as the linear rule, is used primarily for the measurement of linear dimensions. Interconnected with each of said rotatable wheels is an audible indicating system for indication of specified increments of measurement. A control button or thumb screw is provided so that the audible indicating system may be selectively connected to either of the rotatable rules depending on the type of measurement desired.

In the accompanying drawings which illustrate a suitable embodiment of the present invention and in which like numerals refer to like parts throughout the several different views:

Figure 1 is a side elevation of the device.

Figure 2 is a top plan view of the device.

Figure 3 is an end elevation thereof.

Figure 4 is an enlarged transverse section of Figure 1 on the line 4—4 thereof.

Figure 5 is an enlarged face view of the circumference rule measuring wheel viewed from the left side.

Figure 6 is a similar view from the right side of Figure 4.

Figure 7 is an enlarged transverse section of Figure 1 on the line 7—7 thereof.

Figure 8 is an enlarged face view of the linear rule measuring wheel viewed from the left side.

Figure 9 is a similar view from the right side of Figure 7.

Figure 10 is a developed layout of the casing blank reduced in size.

Figures 11 to 14 are enlarged detailed sections on the respective lines indicated in Figure 10.

Figures 15 and 16 are enlarged sectional detailed views of the striker plate or movable bracket, and Figures 17 and 18 are enlarged face and cross-section views respectively of the movable bracket member.

Referring now to the accompanying drawings and in particular to Figure 1, the rotary measuring rule there shown, as described above, consists of a frame 1 in which is mounted the circumference rule rotatable wheel 3 and the linear rule rotatable wheel 5. The frame 1 also has mounted thereon a level 7 which may be used to determine a horizontal or vertical. The rotatable wheels 3 and 5, respectively, are journalled at bearing surfaces 23 and 25 in such a manner that a plane tangent to each of said wheels will be parallel to a plane passing through the horizontal formed by the level 7. This allows the rotatable measuring rules to be used in combination with the level. A right angle is formed between the end section 9 and the base 11, while a 45° angle is formed between the end section 13 and the base 11. The angles made between the base and the two end sections need not be those mentioned, but may be any desired combination angles such as 30° and 60°. Cooperating with either of the rotatable wheels by means of a movable bracket 16 actuated by the thumb screw 36 is an audible indicating system 32 for indication of specified increments of measurement. The operation and construction of the audible indicating system will hereinafter be described in detail as well as other embodiments of the device.

The frame 1 is preferably formed out of sheet material from a pattern as shown in Figure 10. Arcuate slots are provided at 15 and 17 for visual indication of the scale of the circumference rotatable wheel 3, and at 19 and 21 for viewing the scale of the linear rotatable wheel 5. Bearing surfaces 23 and 25 (Fig. 1) are adapted for mounting the spindles 27 and 29 that carry the inner races of the bearings 31 and 33 of the circumference rule rotatable wheel 3 and the linear rotatable wheel 5, respectively. Upon the section 34 forming the top of the frame 1, an indentation 35 is made for mounting the level 7, and another indentation 37 with an elongated slot 39 is made for mounting the thumb screw 36. Although the frame 1 is fabricated from a single sheet of material by a pattern as described above and shown in Fig. 10, it is not intended to limit the scope of the invention by this preferred method of fabrication.

The circumference rule rotatable wheel 3 consists of a sleeve 2 to which is mounted perpendicularly and at either end of the sleeve, disk faces 6 and 8 each carrying the indicating scale for viewing through the arcuate slots 15 and 17. Separating the discs 6 and 8 and suitably located about the disks are five striker pins 10 that contact the arm 12 of the movable bracket 16 when the thumb screw is in the position A. In marking the scales around the circumference of the disc 6 (Fig. 5), the reference points 1 to 5 must be so located that they coincide with the index point 58 on the frame 1 when the bell 14 rings. Therefore, the reference points will not be located on the same radii as the striker pins, but each point will be located slightly behind its respective striker pin. As shown in Fig. 5, an arbitrary angle of 40° is used between the striker pin and the reference point to give the desired results. However, this angle may vary depending upon the construction of the audible indicating system.

In like manner, the linear rule rotatable wheel 5 is fabricated and mounted. It differs only in that it is smaller in diameter and has only one striker pin 18 separating the discs 22 and 24. Since there is only one striker pin separating the discs 22 and 24, braces 26 which will not contact the arm 20 are mounted between the two discs to give the assembly rigidity.

The rotatable wheels 3 and 5 will only operate when rotating in a clockwise direction. Therefore, it is preferred to provide an indicating scale (Figs. 5, 6, 8 and 9) on either side on the wheel assemblies so as to increase the usefulness of the instrument. Indicating scales 28 and 30 for the circumference rule 3 are calibrated so that the bell 14 will ring for each inch of diameter. In this embodiment, it is accomplished by taking a five inch diameter disc and dividing its circumference into five equal parts, these parts thus being the reference points referred to above. Suitable graduations are scribed between each reference point, giving any desired degree of measurement. The indicating scales for the linear rule are calibrated so that the bell 14 will ring for each twelve-inch linear distance. This is accomplished by providing the wheel assembly with one striker pin and making the discs 22 and 24, 3.819 inches in diameter, thus giving the said discs a twelve inch circumference. A scale is then made on discs 22 and 24 by dividing the circumference into inches and any smaller graduations desired. It is not meant to limit the scope of the invention by describing the detailed construction of the rotatable wheels, as it is easily seen where other size wheels with different scales and number of striker pins may be employed.

As previously stated, the device contains an audible indicating system 32 for indication of specified increments of measurement. This system is interconnected with each rotatable wheel, and may be selectively brought into engagement with either wheel depending on what measurement is desired. The audible indicating system 32 consists of a bell 14 which is engaged by clapper 38 rigidly mounted on the movable bracket 16 that is actuated when either of its arms 12 or 20 engage the striker pins 10 or 18 respectively. The movable bracket 16 is made of spring steel or the like. It consists of a single piece of material with the arm 12 punched out of the flat body section 40. Slots 42 and 44 are provided for rigidly mounting the clapper 38. Sides 46 and 48 are provided to give rigidity to the bracket and also to provide a means of securing it to the pivot block 64 on which is mounted the thumb screw 36. The pivot block 64 is provided with a tap 52 for receiving the thumb screw and holes 50 are drilled in the walls of the block for securing the movable bracket. The movable bracket 16 and the pivot block are secured together by means of a pin 62, bolt or other means of fastening. Mounted around the pin 62 is a coil spring 56 having one end engaging the wall of the pivot block 64 and the other end engaging the flat body section 40 of the movable bracket 16. This spring gives resiliency to the movable bracket.

In operating the measuring device, the level right angle and 45° angle are used in a normal manner to make the desired measurements. If it is desired to lay off a piece of sheet material to give a certain diameter pipe, or if it is desired to obtain the outside diameter of a piece of pipe or the like, the thumb screw 36 is first set to position A. Then the zero on the scale of the circumference rule is set adjacent to the index point 58 and a corresponding index point 60 is placed adjacent to the reference or starting point on the material. The rule is then rolled to obtain the desired measurement. For each inch in diameter the striker pins 10 will contact the arm 12 of the bracket 16, and in turn raise the clapper 38 off the bell 14. As the pin passes the arm 12, the spring 56 will cause the bracket to move downward and the clapper which is rigidly mounted to the movable bracket will strike the bell giving an audible indication of measurement. If it is desired to make a linear dimension, the thumb screw 36 is set to the position B, then the zero on the scale of the linear rule is set adjacent to the index point 41 on the frame and a corresponding index point 43 is placed adjacent to the reference point or starting point of the distance to be measured. The rule is then rolled, and for each revolution of the linear wheel, the striker pin 18 will contact the arm 20 and in turn move the clapper away from the bell. After the pin 18 passes the arm 20, the movable bracket is returned by the spring and the bell is rung giving an indication.

A scale 45 placed along the base of the frame is provided to increase the serviceability of the instrument. It may be used in combination with the linear rule when it is desired to measure a distance where the index point 43 cannot be placed next to the starting point. For instance, for measuring the dimension of a room having a wall, the scale 45 may be used in conjunction with the linear rule to obtain the desired floor dimensions.

While the invention has been described and illustrated fully in a preferred form of construction, it is easily seen that this invention is capable of variation and modification without departing from the spirit of the invention. It is, therefore, desired that the invention not be limited to the precise details as set forth, but rather to such variation and modification as come within the scope of the appended claims.

I claim:

1. A measuring device substantially of the character described comprising a frame having two rotatable measuring wheels journaled therein on spaced parallel axes, and an audible indicating system for indicating increments of measurement, said audible indicating system consisting of actuating means responsive to the rotation of either of said rotatable measuring wheels and slidable operating means for bringing said actuating means into alternate operative engagement with either of said rotatable measuring wheels; said actuating means consisting of striker pins mounted on each of said wheels, a bracket pivotally mounted to said slidable operating means and having two legs extending therefrom for respectively engaging said striker pins, a clapper secured to said bracket, a bell mounted on said frame for engagement by said clapper, and spring means for resiliently returning said bracket to the operative position; and said slidable operating means consisting of a thumb screw slidably mounted on said frame for locking said system in an operative position with either wheel, and a pivot block rigidly secured to said thumb screw but pivotally connected to said bracket.

2. A measuring device as set forth in claim 1 having said rotatable measuring wheels of different diameters for determining different specified increments of measurement, the larger of said rotatable measuring wheels comprising two indicating discs mounted on a hub journaled in said frame, and striker pins attached to and separating said discs; the smaller of said rotatable measuring wheels comprising two indicating discs mounted on a hub and journaled in said frame, and having one striker pin and a brace member attached to and separating said discs.

3. A measuring device as set forth in claim 2 having the indicating discs of said larger rotatable measuring wheel calibrated for measurement of diameters, and the indicating discs of said smaller rotatable measuring wheel calibrated for linear measurement.

CLIFFORD H. KELLEY.

REFERENCES CITED

The following references are of record in the file of this patent:

UNITED STATES PATENTS

| Number | Name | Date |
|---|---|---|
| 301,883 | Hall | July 15, 1884 |
| 349,590 | Hollingsworth | Sept. 21, 1886 |
| 889,225 | Haas | June 2, 1908 |
| 1,408,257 | Bohm | Feb. 28, 1922 |
| 1,461,448 | McKechnie | July 10, 1923 |
| 1,663,598 | Holmquist | Mar. 27, 1928 |
| 2,230,990 | Bennett | Feb. 11, 1941 |